United States Patent [19]

Bochkarev et al.

[11] 4,298,380

[45] Nov. 3, 1981

[54] PROCESS FOR PURIFYING LOW-MELTING METALS FROM IMPURITIES

[76] Inventors: Ellin P. Bochkarev, ulitsa Ostrovityanova, 15, korpus 1, kv. 138, Moscow; Igor V. Prokopov, ulitsa Kalinina, 150, kv. 15, Pavlodar; Alexandr V. Eljutin, 3 Frunzenskaya ulitsa, 7, kv. 176, Moscow; Arkady A. Belsky, Komsomolsky prospekt, 48/22, kv. 20, Moscow; Svetlana M. Baryshnikova, ulitsa Udaltsova, 4, kv. 301, Moscow; Nail Z. Nasyrov, ulitsa Kuibysheva, 59, kv. 18, Pavlodar; Nikolai A. Novikov, 3 Institutskaya ulitsa, 15, kv. 49, Moscow; Edige R. Khairulin, ulitsa Kataeva, 54, kv. 6, Pavlodar; Mikhail S. Zvyagin, ulitsa Lenina, 4, kv. 219, Moskovskaya oblast, Reutovo; Vladimir N. Abrjutin, ulitsa Verkhnyaya Maslovka, 7, kv. 68, Moscow; Ljubov I. Konstantinova, ulitsa Glavmosstroya, 1, kv. 110, Moskovskaya oblast, Solntsevo; Nina A. Ljubimova, 11 Parkovaya ulitsa, 44, korpus 4, kv. 36, Moscow; Nadezhda S. Gorbacheva, Tishinskaya ploschad, 6, kv. 51, Moscow, all of U.S.S.R.

[21] Appl. No.: 121,519

[22] Filed: Feb. 14, 1980

[51] Int. Cl.³ ...................... C22B 43/00; C22B 58/00

[52] U.S. Cl. .................. 75/101 BE; 75/97 A; 75/121; 423/100; 423/112

[58] Field of Search ............... 75/101 BE, 121, 97 A; 423/112, 100

[56] References Cited

U.S. PATENT DOCUMENTS

| | | | |
|---|---|---|---|
| 2,440,456 | 4/1948 | Alley et al. | 75/97 A |
| 3,180,812 | 4/1965 | Beau | 75/101 BE X |
| 3,197,274 | 7/1965 | White | 75/101 BE X |
| 3,615,170 | 10/1971 | Hazen et al. | 75/101 BE X |
| 3,971,843 | 7/1976 | Helgorsky et al. | 423/112 |
| 3,984,358 | 10/1976 | Nefedova et al. | 75/101 BE X |
| 3,994,719 | 11/1976 | Corte et al. | 75/121 X |
| 4,098,867 | 7/1978 | Grinstead et al. | 75/101 BE X |
| 4,139,594 | 2/1979 | Rizkalla | 75/101 BE X |
| 4,193,968 | 3/1980 | Sullivan et al. | 75/101 BE X |
| 4,220,726 | 9/1980 | Warshawsky | 75/101 BE X |

FOREIGN PATENT DOCUMENTS

2304063 8/1974 Fed. Rep. of Germany.
1317478 5/1973 United Kingdom.

*Primary Examiner*—G. Ozaki

[57] ABSTRACT

According to the invention a process is proposed for purifying low-melting metals from impurities, residing in that a melt of a low-melting metal is treated with an aqueous solution of an inorganic acid or an alkali in the presence of organic compounds with ionogenic groupings.

The proposed invention enhances the purity degree of the low-melting metal being purified and at the same time reduces the losses thereof.

10 Claims, No Drawings

PROCESS FOR PURIFYING LOW-MELTING METALS FROM IMPURITIES

The present invention relates to non-ferrous metallurgy and more particularly to processes for purifying low-melting metals from impurities, said metals being characterized by low melting points, i.e. by being in a liquid state to at temperatures to 100° C. (for instance, gallium and mercury).

FIELD OF APPLICATION

The process of the invention is suitable for purifying low-melting metals, for instance gallium and mercury, from concomitant impurities, such as zinc, cadmium, indium, thallium, lead, copper, and others. These impurities, as a rule, are present in gallium and mercury when the latter are obtained from various stock materials.

At present low-melting metals, due to the specific properties thereof, find wide application for the production of low-melting alloys, in dentistry, and for preparing semiconducting materials.

Thus, low-melting gallium finds wide application as a component in semiconducting compounds of the $A^{III}B^V$ type, in alloys for fillings, liquid current collectors in electric machines, as a working medium in radiation loops, in high-temperature thermometers, and in other branches of industry and industrial production.

Mercury, as a typical representative of low-melting metals, due to its specific properties is widely used in industry and engineering as a liquid cathode for chlorine and caustic soda production by electrolysis, as a component for fillings, in thermometers of various applications, as a component of complex semiconducting materials and liquid current collectors.

BACKGROUND OF THE INVENTION

Different purity degrees of low-melting metals are required for using thereof in various branches of industry: from technical purity grade with a content of the main substance 99.9–99.99 mass % to special purity grade with a content of the main substance 99.999–99.99999 mass %, the control being performed with respect to a rather wide range of impurities.

To purify these metals, a set of various processes is usually used such as electrochemical refining, distillation, crystallization and electrophysical purification. These processes, as a rule, make it possible to remove impurities with specific properties, for instance, less or more volatile, with a separation coefficient much more or less than unity, or characterized by a different location in the electromotive series. In addition, the use of the above-cited processes in a number of cases calls for a preliminary, sufficiently complete, purification of the metal from impurities.

At the stage of preliminary purification of gallium and mercury use is made of such procedures as filtration and hydrochemical treatment in solutions of various compounds such as acids, alkalis, salts.

One of the main methods of purification of low-melting metals, obtained by extraction thereof from different raw materials, is treatment of the melt with aqueous solutions of acids or alkalis or treatment of the melt with an aqueous solution of acids and then with an aqueous solution of alkalis, or vice versa.

Thus, the process described in British patent application No. 1,317,478, cl. C7B, 1973, resides in that liquid gallium and mercury are passed dropwise through an aqueous solution of sodium hydroxide and hydrochloric acid, respectively. The impurities which have a higher redox potential pass into the aqueous solution and the metal becomes purified. The disadvantage of the process consists in considerable losses of the metal being purified due to dispersion thereof and entrainment of the smallest drops of the molten low-melting metal with the solution, as well as due to chemical dissolution. Losses of metallic gallium amount to 10% of the initial gallium content.

According to another known process disclosed in Federal Republic of Germany Offenlegungsschrift Application No. 2,304,063, cl. 40a 43/00, 1974, liquid low-melting metal containing impurities, for instance, mercury, is subsequently treated, under intensive stirring with a solution containing mercury sulphate and sulphuric acid at a concentration of 0.05–5 M at 10°–120° C., after which electrolysis is performed; as a result the content of impurity (iron) is reduced to $5.10^{-6}$ in mass. The disadvantages inherent in this process are similar to those inherent in the above-cited process.

In addition, during the electrolysis an amalgam saturated with impurities is formed; said amalgam must be treated and subjected to mercury extraction.

The main and common disadvantage of the known processes involving hydrochemical treatment of low-melting metals with solutions of acids, alkalis, or salts, resides in that upon such treatment only the impurities are removed which are less noble than the metal being purified. Besides, the known processes are performed at 60°–90° C., which results in a considerable chemical dissolution of the metal being purified.

BRIEF DESCRIPTION OF THE INVENTION

It is an object of the present invention, in a process for purifying low-metal metals from impurities, to provide a technology of accomplishing the process, which will enhance the purity degree of low-melting metal and simultaneously decrease the losses thereof.

This object is accomplished by that in a process for purifying fusible methods from impurities by treating the melt of the low-melting metal with an aqueous solution of an inorganic acid or an alkali, according to the present invention, said treatment is performed in the presence of organic compounds with ionogenic groupings.

According to the invention the process can be accomplished in such a way that, after treating the melt of the low-melting metal with an aqueous solution of an acid in the presence of organic compounds with ionogenic groupings, said melt is treated with an aqueous solution of an alkali in the presence of organic compounds with ionogenic groupings.

According to another version of accomplishing the process, it is preferable to treat the melt of the low-melting metal being purified first with an aqueous solution of an alkali in the presence of organic compounds with ionogenic groupings and then with an aqueous solution of an acid in the presence of organic compounds with ionogenic groupings.

As organic compounds with ionogenic groupings it is expedient to use alcohols, esters, ketones, organophosphorus compounds, amines, organic acids, organophosphorus acids, salts of organic acids, anionites, cationites, ampholytes, or various mixtures of the above-cited compounds.

Since at present a great number of sorbents and extracting agents are available which make it possible to extract selectively from aqueous solutions almost any element of the Periodic Table, the herein-proposed process is rather universal and allows for purifying metals from any impurity. The use of a mixture of organic compounds with ionogenic groupings enhance either the selectivity of extraction of certain impurity or collective extraction of impurities from the metal, which, in its turn, increases the purification degree of the metal being purified, decreases the losses of the metal upon refining, reduces the duration of the process, and lowers the temperature of the process.

Other objects and advantages of the present invention will-become more fully apparent detailed description of the invention and specific examples of realizing thereof, given hereinbelow by way of illustration.

DETAILED DESCRIPTION OF THE INVENTION

The invention resides in that in the presence of organic compounds with ionogenic groupings, upon treatment of the melt of a low-melting metal with an acid or an alkali, the equilibrium in the system "the purified metal-impurity in the metal-aqueous solution of acid or alkali with organic compound" is shifted towards the passage of the impurity into the aqueous solution from which it is absorbed by the organic compound having ionogenic groupings.

The low-melting metal, for instance gallium or mercury, is contacted in a special reactor manufactured from an organic material with an aqueous solution of an acid or alkali to which an organic compound with ionogenic groupings or a mixture of organic compounds with ionogenic groupings are preliminarily added. It is preferable to take said components in the following volume ratio: low-melting metal:aqueous solution of acid or alkali:organic compound with ionogenic grouping = 1:0.5-5:0.1-5, respectively. The mixture obtained is kept in contact under stirring at 30°-70° C. for 20-60 minutes. Use is made of electromagnetic, vibrational, or mechanical stirring.

Most preferable for accomplishing the process is stirring with the aid of an alternating electromagnetic field. The metal is effectively stirred and does not disperse in the aqueous-organic mixture. In the case of processing large amounts of low-melting metals it is expedient to use combined methods of stirring, i.e. electromagnetic for the metal and vibrational or mechanical for the aqueous-organic medium.

After purification of the low-melting metal the latter is separated from the aqueous-organic phase, washed with water, dried, and analyzed for the impurity content.

Depending on the amount of the low-melting metal subjected to purification, i.e. on the qualitative and quantitative content of the impurities therein, use is made of organic compounds with different ionogenic groupings. These compounds are selected from the group of netural organic compounds of the type of alcohols, esters, ketones organophosphorus compounds such as phosphates, phosphonates, phosphinates, phosphinoxides, primary, secondary, or tertiary amines and ammonium bases, organic acids such as phosphoric, phosphinic, phosphonic, carboxylic, naphthenic, hydroxamic, and others. The above-cited compounds fall into the category of extracting agents. Another group of reagents is selected from the class of sorbents which include cation exchangers, anion-exchangers, and ampholytes.

EXAMPLE 1

Liquid gallium in the amount of 1 l containing $2.10^{-2}$ mass % of copper and $3.10^{-1}$ mass % of zinc is poured into a reactor. 1 liter of hydrochloric acid solution with a concentration of 2.5 mol/l and 0.1 liter of isoamyl alcohol ($C_5H_{11}OH$) are added to the metal. The mixture obtained is stirred at 30° C. for 15 minutes. Stirring is performed with the aid of an inductor of an electromagnetic field at a strength of 40000 amperes. After 15 minutes the stirring is stopped and sedimentation is performed. The purified gallium, as the heaviest component of the system, is collected in the bottom part of the reactor; above it a layer is formed containing the acid and isoamyl alcohol with impurities which have passed into it as a result of the treatment. The acid and alcohol containing impurities are separated from gallium, a metal is washed with water to neutral reaction, dried, and analyzed by the spectral method. The content of copper and zinc in the purified gallium is $4.10^{-3}$ and $5.10^{-5}$ mass %, respectively.

EXAMPLE 2

Liquid gallium in the amount of 1 liter containing $7.10^{-2}$ mass % of thallium is poured into a reactor. 1 liter of hydrobromic acid at a concentration of 4 mol/l and 0.15 liters of diethyl ether $(C_2H_5)_2O$ are added to the metal. The mixture obtained is stirred with a mechanical impeller stirrer at a speed of 100 rpm and at a temperature of 30° C. After 20 minutes the stirring is stopped and sedimentation is performed. The organic and aqueous phases containing impurities are decanted and separated in a separatory funnel; the metal is washed with a purified water, dried, and analyzed for the impurity content.

After purification the content of thallium decreased to $5.10^{-4}$ mass %.

EXAMPLE 3

1 liter of liquid gallium containing $7.10^{-2}$ mass % of thallium is poured into a reactor. 2.5 l of aqueous solution of hydroiodic acid at a concentration of 1 mol/l and 0.5 l of dichlorodiethyl ether $(C_2H_4Cl)_2O$ are added to the metal. The mixture obtained is stirred with the aid of a vibrator for 10 minutes at 35° C. Then the stirring is stopped aqueous and organic phases are decanted, and the purified metal is washed with water, dried, and analyzed. The content of thallium in the purified metal is $5.10^{-3}$ mass %.

EXAMPLE 4

1 liter of liquid gallium containing $2.10^{-4}$ mass % of lead is poured into a reactor. 1.5 liter of 4 N nitric acid and 0.8 liter of 10% tetrabutylethylene diphosphonate $(C_4H_9O)_2PO(CH_2)_2PO(C_4H_9)_2$ in xylene are added to the metal. The mixture obtained is stirred for 5 minutes with the aid of the travelling electromagnetic field having an intensity of 30,000 A/m at 35° C. After that the stirring is stopped, the aqueous and organic phases containing impurities are decanted, and the metal is washed with purified water, dried, and analyzed for the lead content. After purification the content of the impurity in gallium decreased to $9.10^{-5}$ mass %.

EXAMPLE 5

1 liter of liquid gallium containing $7.10^{-2}$ mass % of thallium is poured into a reactor. 1 liter of 1 N nitric acid and 1 liter of 0.45 M solution of α-nonylpyridine-N-oxide $(C_6H_4(C_9H_{19}))NO$ in benzene are added to the metal. The mixture obtained is stirred with the aid of a vibrator and a travelling electromagnetic field having an intensity of 20,000 A/m simultaneously for 7 minutes at 35° C. After that the stirring is stopped and the aqueous and organic phases containing impurities are decanted. The purified metal is washed with purified water, dried, and analyzed for the impurity content.

After purification the content of thallium decreased to $5.10^{-4}$ mass %.

EXAMPLE 6

6 liters of 2 N aqueous solution of hydrochloric acid and 0.7 liter of 1% tributylphosphine oxide $(C_4H_9)_3PO$ in toluene are poured into a reactor. The mixture obtained is stirred with a mechanical impeller stirrer at 150 rpm. Metallic liquid gallium is passed dropwise at 40° C. through the mixture obtained. The initial content of zinc and indium impurities in gallium is $1.10^{-1}$ and $1.10^{-3}$ mass %, respectively. The drops of the metal are 0.8-2 mm in diameter. When all the metal is dropped through, the aqueous and organic phases containing impurities are decanted and the purified metal is washed with water, dried, and analyzed for the impurity content.

After purification the content of zinc and indium impurities in gallium reduced to $3.10^{-5}$ and $3.10^{-4}$ mass %, respectively.

EXAMPLE 7

1 liter of liquid gallium containing $2.10^{-2}$ mass % of cadmium is poured into a reactor. 1.5 l of 1 N nitric acid and 1 liter of 10% tetrabutylmethylenediphosphonate $(C_4H_9)_2POCH_2PO(C_4H_9O)_2$ in xylene are added to the metal. The mixture obtained is stirred with an impellor stirrer rotating at a speed of 200 rpm. In 10 minutes the aqueous and organic phases containing impurities are decanted, the metal is washed with purified water, dried, and analyzed for the impurity content.

After purification the content of cadmium impurity in gallium decreased to $3.10^{-3}$ mass %.

EXAMPLE 8

1 liter of liquid gallium containing $1.10^{-3}$ mass % of indium and $2.10^{-2}$ mass % of copper is poured into a reactor. The process is performed by following the procedure described in Example 1. The difference consists in that gallium is treated with 2 N solution of HBr and 100 % tributylphosphate $(C_4H_9O)_3PO$. The amount of acid and extracting agent is 0.5 and 4 liters, respectively. The treatment is performed at 40° C. for 15 minutes. The concentration of indium and copper in gallium decreased to $2.6.10^{-4}$ and $8.10^{-3}$ mass %, respectively.

EXAMPLE 9

0.5 liter of gallium containing $7.10^{-2}$% of thallium is poured into a reactor. 0.5 liter of 4 M $H_2SO_4$ and 0.05 liter of 100% tributyl phosphate $(C_4H_9O)_3PO$ are added to the metal. The mixture obtained is stirred with a travelling electromagnetic field having an intensity of 20,000 A/m for 20 minutes at 35° C. The aqueous and organic phases are decanted and the metal is washed, dried, and analyzed.

After purification the content of impurity in gallium decreased to $2.10^{-2}$ mass %.

EXAMPLE 10

1 liter of gallium containing $2.10^{-1}$ and $2.10^{-4}$ mass % of cadmium and lead, respectively is poured into a reactor. 1 liter of 1.5 M HCl, 0.1 liter of 0.6 M solution of primary amine $C_6H_5NH_2$, and 0.6 liter of methylisobutyl ketone $(CH_3)(iC_4H_9)CO$ are added to the metal. The mixture obtained is stirred with an impeller stirrer at 150 rpm for 15 minutes at 40° C. Then the process is performed by following the procedure described in Example 1. The content of cadmium and lead impurities in purified gallium is $1.10^{-3}$ and $9.10^{-5}$ mass %, respectively.

EXAMPLE 11

1 liter of liquid gallium containing $2.10^{-2}$ mass % of copper is poured into a reactor. 0.5 liter of $1.5.10^{-M}$ solution of 2,2';4,4';6,6'-hexanitrodiphenyl amine-$[(NO_2)_3C_6H_2)]_2NH$ in nitrobenzene and 0.5 liter of $5.10^{-3}$ M solution of NaOH with 0.15 M content of $NaNO_3$(1 l) are added to the metal. The mixture is stirred by an impeller stirrer for 10 minutes at 35° C. Then the process is performed by following the procedure described in Example 1.

The content of copper impurity in purified gallium is $8.10^{-4}$ mass %.

EXAMPLE 12

1 liter of liquid gallium containing $1.10^{-2}$ mass % of tin is poured into a reactor. 0.5 liter of tricaprylamine and 6 M solution of HCl (1 liter) are added to the metal. After stirring the mixture with a travelling electromagnetic field having an intensity of 4500 A/m for 20 minutes at 40° C., the stirring is stopped. Then the process is performed by following the procedure described in Example 1.

The content of tin impurity in purified gallium is $2.10^{-3}$ mass %.

EXAMPLE 13

1 liter of liquid gallium containing $1.10^{-1}$ mass % of zinc and $2.10^{-2}$ mass % of cadmium is poured into a reactor. 0.4 liter of 0.1 M solution of methyltricapryl ammonium $[C_8H_{17})_3NCH_3]$ in 3% ethylenebenzene and 1 liter of 0.2 M solution of HCl with 3 M of lithium chloride were added to the metal. The mixture obtained is stirred for 20 minutes with an impeller stirrer (200 rpm) at 40° C. Then the process is performed by following the procedure described in Example 1. The zinc and cadmium content in purified gallium decreased to less than $3.10^{-5}$ and $3.10^{-4}$ mass %, respectively.

EXAMPLE 14

1 liter of gallium containing $1.10^{-3}$ mass % of indium, $2.10^{-2}$ mass % of zinc, and $1.10^{-2}$ mass % of copper is poured into a reactor. 0.3 liter of 0.5 M solution of di-2-ethylhexylphosphoric acid $[C_4H_9CH(C_2H_5)CH_2O]_2PO(OH)$ in heptane and 1 liter of 0.2 M solution of NaOH are added to the metal. The mixture obtained is stirred with a travelling electromagnetic field having an intensity of 25,000 A/m for 5 minutes at 30° C. Then the stirring is stopped and the purified metal is separated from the solution of the organic phase and alkali containing impurity. The metal is washed and treated again with a mixture of 100% tributylphosphate $(C_4H_9O_3)_3PO$ and 2 N solution of NaOH taken in amounts 0.6 and 0.3 liter, respectively. The process is performed for 10 minutes at 40° C. with the aid of an impeller stirrer at 150 rpm. The purified metal is separated from the solution of organic phase and acid, washed with water, and analyzed. The concentration in gallium of indium, zinc, and copper impurities reduced to $1.10^{-4}$, less than $3.10^{-5}$, and $1.10^{-3}$ mass %, respectively.

EXAMPLE 15

1 liter of liquid gallium containing indium, thallium, and zinc in amounts $2.10^{-3}$, $7.10^{-2}$, and $3.10^{-2}$ respectively is poured into a reactor. First the metal is treated with 0.5 l of 1% solution of tributylphosphine oxide $(C_4H_9)PO$ in toluene and 2 l of 2 N HCl. The mixture obtained is stirred with an impeller stirrer at 200 rpm for 15 minutes at 35° C. After the stirring is over the purified metal is separated from the solution containing the organic phase, acid, and impurities, washed with water, dried and treated again with 0.5 l of 0.5 M solution of 2-ethylhexylphosphoric acid $[C_4H_9CH(C_2H_5)CH_2O]_2$-$PO(OH)$ in heptane and 0.4 l of 1 M solution of $NH_4OH$. The process is carried out at 30° C. for 7 minutes; the mixture is stirred with an impeller stirrer at 150 rpm. Then the metal is separated, washed with purified water, dried, and analyzed. Concentration of indium, thallium, and zinc impurities reduced to $3.10^{-4}$, $7.10^{-4}$, and $3.10^{-5}$ mass %, respectively.

EXAMPLE 16

0.1 liter of liquid mercury containing $1.10^{-1}$ mass % of gallium is poured into a reactor. 0.3 l of cyclohexanol $C_6H_{11}OH$ and 0.2 l of 3 M HCl are added to the metal. The mixture obtained is stirred with a travelling electromagnetic field having an intensity of 30,000 A/m for 20 minutes at 25° C. Then the aqueous and organic phases are decanted, the metal is washed with purified water, dried, and analyzed. After purification the gallium content in the metal reduced to $1.7.10^{-2}$ mass %.

EXAMPLE 17

0.1 liter of liquid mercury containing $2.10^{-1}$ mass % of zinc is poured into a reactor. 0.2 l of 0.5 M HCl and 0.02 l of diethyl ether $(C_2H_5)_2O$ are added to the metal. The mixture obtained is stirred by an impeller stirrer at 200 rpm at 20° C. for 15 minutes. Then the process is performed by following the procedure described in Example 16. The content of zinc impurity in mercury reduced to $3.10^{-5}$ mass %.

EXAMPLE 18

0.1 liter of liquid mercury containing $2.10^{-2}$ mass % of lead is poured into a reactor, 0.5 l of 30 % tributylphosphate in methylisobutyl ketone and 0.3 l of 3 M HCl are added to the metal. The mixture obtained is treated by following the procedure described in Example 16.

After purification the content of lead reduced to $9.10^{-4}$ mass %.

EXAMPLE 19

0.1 liter of liquid mercury containing $2.10^{-2}$ mass % of copper is poured into a reactor. 0.05 l of 3 M $H_2SO_4$ and 0.4 l of benzoylphenyl hydroxylamine $(C_6H_5CONOHC_6H_5)$ solution in $CHCl_3$ are added to the metal.

The mixture obtained is stirred with a travelling electromagnetic field having an intensity of 30,000 A/m for 10 minutes at 40° C. Then the process is performed by following the procedure described in Example 16. The content of copper impurity in mercury reduced to $3.10^{-3}$ mass %.

EXAMPLE 20

0.5 liter of liquid gallium containing $2.10^{-2}$ mass % of lead and $1.10^{-2}$ mass % of copper is poured into a reactor. 1 liter of 1 N sulphuric acid and 0.25 liter of di-2-ethylhexyldithiophosphoric acid in heptane are added to the metal. The mixture obtained is stirred with a travelling electromagnetic field having an intensity of 25,000 A/m for 15 minutes at 35° C. Then the process is performed by following the procedure described in Example 1. The content of tin and copper impurities reduced to $3.10^{-3}$ and $8.10^{-4}$ mass %, respectively.

EXAMPLE 21

0.5 liter of liquid gallium containing $2.10^{-2}$ mass % of cadmium and $5.10^{-2}$ mass % of indium is poured into a reactor. 0.75 liter of 1 N solution of HCl and 0.35 litre of dibutyldithiophosphoric acid in carbon tetrachloride are added to the metal. Then the process is performed by following the procedure described in Example 1. The content of cadmium and indium impurities is gallium reduced to $4.10^{-4}$ and $2.10^{-3}$ mass %, respectively.

EXAMPLE 22

0.5 liter of liquid gallium containing $2.10^{-2}$ mass % of copper is poured into a reactor. 0.5 l of a solution of 1 M enanthic acid $[CH_3(CH_2)_5COOH]$ in carbon trichloride $CHCl_3$ is added to the metal. The process is performed by following the procedure described in Example 1. The content of copper impurity reduced to $9.10^{-3}$ mass %.

EXAMPLE 23

0.5 liter of liquid gallium containing $3.10^{-3}$ mass % of cadmium and $1.10^{-2}$ mass % of copper is poured into a reactor. 0.4 liter of 5 M $H_2SO_4$ and 1.0 liter of cationite KY-2 are added to the metal (the cationite on a polystyrene matrix with a sulpho-group having the general formula:

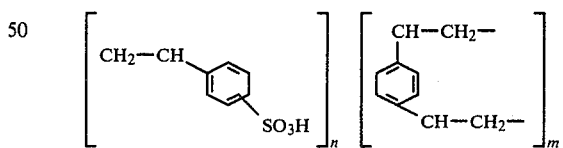

The mixture obtained is stirred with a mechanical stirrer at a speed of 200 rpm at 40° C. for 15 minutes. After the stirring is over, the molten gallium as the heaviest component of the system is collected in the bottom part of the reactor. Gallium purified from the impurities is filtered through a porous glass plate, separated from said cationite, and then, in a separatory funnel, from the sulphuric acid solution. The purified gallium is washed with water to neutral reaction, dried, and analyzed by the spectral method.

The content of copper impurity in gallium was $6.10^{-3}$ mass % and cadmium, $1.10^{-3}$ mass %.

EXAMPLE 24

0.5 liter of liquid gallium containing $1.10^{-2}$ of copper and $3.10^{-3}$ of cadmium (in mass %) is poured into a reactor.

The purification process is accomplished by following the procedure described in Example 23 but as a sorbent use is made of anionite AH-31 obtained by polycondensation of ethylene polyamines with epichlorohydrin $$\left[ NH_2-(CH_2)_n-NH-CH_2-\underset{\underset{OH}{|}}{CH}-NH-(CH_2)_n-NH- \right]_n$$

in an amount of 1.5 liter; the process is performed in 0.5 l of 4 M $H_2SO_4$ with stirring at 150 rpm for 20 minutes at a temperature of 35° C. The final concentration of impurities is in mass %: Cu, $5.10^{-3}$ and Cd, $1.5.10^{-3}$.

EXAMPLE 25

0.5 liter of liquid gallium containing $1.10^{-2}$ mass % of copper is poured into a reactor.

The purification process is performed by following the procedure described in Example 23, but as a sorbent use is made of ampholyte AHKB-2 obtained by oxidation of a copolymer of 2-methyl-5-vinyl-pyridine with divinylbenzene containing groups of picolinic acid and having the general formula $$\left[ \begin{array}{c} CH_2-CH \\ \phantom{xx} \bigodot\!\!-COOH \\ \phantom{xxxx} N \end{array} \right]_n \left[ \begin{array}{c} CH-CH_2- \\ \bigodot \\ CH-CH_2- \end{array} \right]_m$$

in an amount of 1.5 liter. The process is performed in 0.5 liter of 4 M $H_2SO_4$ with vibrational stirring for 1.5 minutes at 40° C. The final concentration of copper in purified gallium is $2.10^{-3}$ mass %.

EXAMPLE 26

0.5 liter of liquid gallium containing $1.10^{-2}$ mass % of tin and $2.4.10^{-3}$ mass % of nickel is poured into a reactor. The process of purification of liquid gallium is performed by following the procedure described in Example 23, but as a sorbent use is made of anionite AB-17, obtained by polymerization of styrene with divinylbenzene with introduction of trimethylamine groupings, having the formula:

$$\left[ \bigodot\!\!-CH_2-N(CH_3)_3 \right]_n \left[ \begin{array}{c} CH-CH_2- \\ \bigodot \\ CH-CH_2- \end{array} \right]_m$$

said sorbent being used in an amount of 0.5 liter. The process is performed in 0.5 liter of 2 N HCl with electromagnetic stirring (25,000 A/m) at 30° C. for 30 minutes. The final concentration of impurities in mass % is: Sn, $3.10^{-3}$ and Ni, $9.10^{-4}$.

EXAMPLE 27

0.5 liter of liquid gallium containing $5.3.10^{-1}$ mass % of tin is poured into a reactor.

The purification process is performed by following the procedure described in Example 23, but as a sorbent use is made of 0.25 liter of anionite AB 17 obtained as described in Example 26. The process is carried out in 2.5 liter of 2 N $HCl+H_2SO_4$ (1:2) with stirring (200 rpm) for 15 minutes at 30° C. The final concentration of tin in gallium is $2.10^{-1}$ mass %.

EXAMPLE 28

1 liter of mercury containing a tin impurity in an amount of $6.10^{-1}$ mass % is poured into a reactor. The process of mercury purification is carried out by following the procedure described in Example 23, but as a sorbent use is made of anionite AB-17 obtained as described in Example 26 in an amount of 0.2 liter. The process is carried out in 2 liters of 1 N HF+8 N HCl (1:1) with stirring (150 rpm) at 30° C. for 20 minutes.

The final concentration of impurity in mass % is $7.10^{-2}$.

EXAMPLE 29

0.5 liter of mercury containing an impurity of Ni in an amount of $3.10^{-3}$ mass %, is poured into a reactor.

The process of metal purification is performed by following the procedure described in Example 23, but as a sorbent use is made of anionite AB-17 obtained as described in Example 26 in an amount of 0.05 l.

The process is performed in 1 l of 2 N HCl with stirring (200 rpm) at 25° C. for 15 minutes.

The final concentration of impurity in mass % is $1.10^{-3}$.

EXAMPLE 30

1 liter of liquid gallium containing Ni impurity in an amount of $3.10^{-4}$ mass % is poured into a reactor.

The process of metal purification is performed by following the procedure described in Example 23, but as a sorbent use is made of 1.5 l of anionite BII-1 obtained by polymerization of 2-methyl-5-vinyl-pyridine and having the formula:

$$\left[ \begin{array}{c} CH-CH_2- \\ \bigodot\!\!-N \\ \phantom{xx} CH_3 \end{array} \right]_n \left[ \begin{array}{c} CH-CH_2- \\ \bigodot \\ CH-CH_2- \end{array} \right]_m$$

The process is performed in 2 liters of 9 N solution of HCl with stirring (200 rpm) at 35° C. for 20 minutes. The final concentration of Ni impurity is $9.10^{-5}$ mass %.

EXAMPLE 31

1 liter of liquid gallium containing $2.10^{-2}$ mass % of Zn, $2.10^{-2}$ mass % of Sn, and $2.10^{-3}$ mass % of Ni is poured into a reactor.

The process of metal purification is performed by following the procedure described in Example 1, but as sorbents use is successively made of 0.3 liter of cationite KY-2 (obtained as described in Example 23) in 2 liters of $NH_4OH$ solution (1:3) and then of 0.7 liter of anionite AB-17 (obtained as described in Example 26) in 1 l of 2

N HCl. The process is carried out at 30° C. with stirring (150 rpm) for 10 minutes.

The final concentration of impurities in mass % is: Zn, $2.10^{-5}$; Sn, $1.10^{-3}$; Ni, $7.10^{-4}$.

EXAMPLE 32

0.5 liter of mercury containing $2.10^{-1}$ mass % of Zn, $4.10^{-4}$ mass % of Ni, $5.10^{-1}$ mass % of Sn is poured into a reactor.

The process of mercury purification is performed by following the procedure described in Example 1, but as a sorbent use is made of a mixture of anionite AB-17 (obtained as described in Example 26) and cationite KY-2 (obtained as described in Example 26) in an amount 1 liter (1:1).

The process is performed in 1 liter of 5 N HCl with stirring (150 rpm) at 35° C. for 15 minutes.

The final concentration of impurities in mass % is: Zn, $2.10^{-5}$; Ni, $1.10^{-4}$; Sn, $7.10^{-2}$.

EXAMPLE 33

1 liter of liquid gallium containing $3.10^{-1}$ mass % of Zn, $3.10^{-3}$ mass % of Cd, $2.10^{-4}$ mass % of Ni is poured into a reactor.

The purification process is performed by following the procedure described in Example 23, but as a sorbent use is made of a mixture of anionite AH-1 obtained by polycondensation of ethylene-polyamines with epichlorohydrin and having the formula

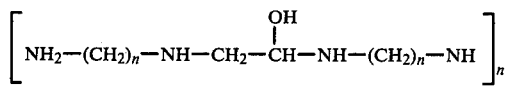

and ampholyte AHKB 2, obtained as described in Example 25, in an amount of 2 liters (1:1)

The process is performed in 0.5 l of 4 N HCl with vibrational stirring at 40° C. for 15 minutes.

The final concentration of impurities in mass % is: Zn, $2.10^{-5}$; Cd, $7.10^{-4}$; Ni, $1.10^{-4}$.

EXAMPLE 34

1 liter of mercury containing $3.10^{-3}$ mass % of Ni, $5.10^{-1}$ mass % of Zn, and $6.10^{-3}$ mass % of Sn is poured into a reactor.

The process is performed by following the procedure described in Example 23, but as sorbents use is successively made of cationite KY-2 (obtained as described in Example 23) in an amount of 0.7 liter in 5 l of NaOH solution at a concentration of 100 g/l and then of 0.7 liter of anionite AB-17 (obtained as described in Example 26) in 5 l of 7 N HCl solution.

The process is carried out with stirring (200 rpm) at 35° C. for 10 minutes for each resin.

The final concentration of impurities in mass % is; Ni, $1.10^{-4}$; Zn, $5.10^{-4}$; and Sn, $2.5.10^{-3}$.

EXAMPLE 35

0.5 liter of liquid gallium containing $5.10^{-1}$ mass % of Sn and $1.9.10^{-3}$ mass % of Ni is poured into a reactor.

The process is performed by following the procedure described in Example 23, but as a sorbent use is made of a mixture of cationite KY-23 (macroporous structure of cationite KY-2 obtained as described in Example 23), AB-17 (obtained as described in Example 26) and cationite K∞-1 (obtained by polycondensation of styrene with divinylbenzene with a subsequent introduction of phosphoric acid groups having the formula

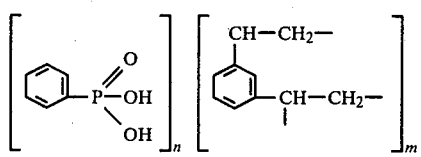

the ratio of said components being 1:1:0.5, respectively, and in an amount of 0.5 liter.

The final concentration of impurities in mass % is: Sn, $2.7.10^1$ and Ni, $8.10^{-5}$.

What we claim is:

1. A process for purifying low-melting metals selected from the group consisting of gallium and mercury from metallic impurities comprises treating a melt of said metal with an aqueous solution of a compound selected from the group consisting of an inorganic acid and alkali in the presence of organic compounds with ionic groups.

2. A process as claimed in claim 1, wherein, after treating a melt of said metal with an aqueous solution of an acid in the presence of organic compounds with ionic groups, said melt is treated with an aqueous solution of an alkali in the presence of organic compounds with ionic groups.

3. A process as claimed in claim 1, wherein, after treating a melt of said metal with an aqueous solution of an alkali in the presence of organic compounds with ionic groups, said melt is treated with an aqueous solution of an acid in the presence of organic compounds with ionic groups.

4. A process as claimed in claim 1, wherein as organic compounds with ionic groups use is made of a compound selected from the group consisting of alcohols, esters, ketones, organophosphorus compounds, amines, organic and organophosphoric acids, salts of organic acids, anion exchangers, cation exchangers, amphoteric ion exchangers and mixtures of said compounds.

5. The process of claim 1 wherein said organic compound is diethyl ether.

6. The process of claim 1 wherein said organic compound is isoamyl alcohol.

7. The process of claim 1 wherein said organic compound is tetrabutylethylenediphosphonate.

8. The process of claim 1 wherein said organic compound is alpha-nonylpyridine-N-oxide.

9. The process of claim 1 wherein said organic compound is an anion exchanger obtained by polycondensation of ethylene polyamine with epichlorohydrin.

10. The process of claim 1 wherein the maximum amount of said metallic impurities at the start of said process is $6.10^{-1}$ mass %.

* * * * *